(12) United States Patent
Li et al.

(10) Patent No.: US 12,338,646 B2
(45) Date of Patent: Jun. 24, 2025

(54) METHOD FOR MANUFACTURING WIND TURBINE TOWER STRUCTURE WITH EMBEDDED REINFORCEMENT ELEMENTS

(71) Applicant: General Electric Company, Schenectady, NY (US)

(72) Inventors: Xiaopeng Li, Niskayuna, NY (US); Gregory Edward Cooper, Greenfield Center, NY (US); Norman Arnold Turnquist, Carlisle, NY (US); Christopher James Kenny, Schoharie, NY (US)

(73) Assignee: GE Vernova Infrastructure Technology LLC, Greenville, SC (US)

( * ) Notice: Subject to any disclaimer, the term of this patent is extended or adjusted under 35 U.S.C. 154(b) by 204 days.

(21) Appl. No.: 17/915,727

(22) PCT Filed: Mar. 31, 2020

(86) PCT No.: PCT/US2020/025929
§ 371 (c)(1),
(2) Date: Sep. 29, 2022

(87) PCT Pub. No.: WO2021/201840
PCT Pub. Date: Oct. 7, 2021

(65) Prior Publication Data
US 2023/0135767 A1    May 4, 2023

(51) Int. Cl.
*E04H 12/34* (2006.01)
*B28B 1/00* (2006.01)
(Continued)

(52) U.S. Cl.
CPC ........... *E04H 12/341* (2013.01); *B28B 1/001* (2013.01); *B33Y 10/00* (2014.12); *B33Y 30/00* (2014.12);
(Continued)

(58) Field of Classification Search
CPC ......... B29C 64/10; B29C 64/20; B29C 64/30; E04G 21/0427; E04G 21/0463;
(Continued)

(56) References Cited

U.S. PATENT DOCUMENTS

| 3,516,129 A | 6/1970 | Yoder |
|---|---|---|
| 8,778,479 B2 | 7/2014 | Bech |

(Continued)

FOREIGN PATENT DOCUMENTS

| CN | 108191360 A | 6/2018 |
|---|---|---|
| CN | 208154190 U | 11/2018 |

(Continued)

OTHER PUBLICATIONS

PCT International Search Report Corresponding to PCT/US2020/025929 on Nov. 27, 2020.

(Continued)

*Primary Examiner* — Nahida Sultana
(74) *Attorney, Agent, or Firm* — Dority & Manning, P.A.

(57) ABSTRACT

A system for manufacturing a structure includes a supporting frame assembly moveable in a vertical direction of the structure. Further, the system includes an additive printing assembly secured to the supporting frame assembly. The additive printing assembly includes at least one printer head configured to dispense a first cementitious material. The system also includes a reinforcement dispensing assembly supported by the supporting frame assembly. Thus, the reinforcement dispensing assembly is configured to automatically and continuously dispense a plurality of reinforcing members as the structure is printed and built up via the at least one printer head and as the supporting frame assembly moves in the vertical direction.

12 Claims, 9 Drawing Sheets

(51) Int. Cl.
*B33Y 10/00* (2015.01)
*B33Y 30/00* (2015.01)
*B33Y 80/00* (2015.01)
*E04G 21/04* (2006.01)
*E04H 12/12* (2006.01)

(52) U.S. Cl.
CPC .......... *B33Y 80/00* (2014.12); *E04G 21/0427* (2013.01); *E04H 12/12* (2013.01)

(58) Field of Classification Search
CPC ......... E04G 11/22; B33Y 10/00; B33Y 30/00; B33Y 80/00; E04H 12/12; E04H 12/16; E04H 12/341; B28B 1/001
See application file for complete search history.

(56) References Cited

U.S. PATENT DOCUMENTS

| | | | |
|---|---|---|---|
| 9,331,534 | B2 | 5/2016 | Yost |
| 9,375,861 | B2 | 6/2016 | Schibsbye |
| 9,388,598 | B2 | 7/2016 | Stiesdal |
| 11,021,887 | B2 | 6/2021 | Keller et al. |
| 2010/0257792 | A1 | 10/2010 | Khoshnevis |
| 2011/0041733 | A1 | 2/2011 | Bartl et al. |
| 2012/0159785 | A1 | 6/2012 | Pyles et al. |
| 2015/0300036 | A1 | 10/2015 | Khoshnevis |
| 2015/0367375 | A1 | 12/2015 | Page |
| 2017/0016244 | A1 | 1/2017 | Keller et al. |
| 2017/0129153 | A1* | 5/2017 | Koivuharju ........... B28B 3/2636 |
| 2017/0129171 | A1 | 5/2017 | Gardner et al. |
| 2017/0225445 | A1 | 8/2017 | Gardiner |
| 2017/0305034 | A1 | 10/2017 | Grivetti et al. |
| 2018/0071949 | A1 | 3/2018 | Giles |
| 2019/0292803 | A1 | 9/2019 | Meyer et al. |
| 2022/0032497 | A1 | 2/2022 | Turnquist et al. |
| 2022/0412107 | A1* | 12/2022 | Turnquist ............ E04G 21/0463 |
| 2024/0141674 | A1* | 5/2024 | Turnquist ................ B28B 1/001 |
| 2024/0157644 | A1* | 5/2024 | Tobin .................... B29C 64/321 |
| 2024/0328178 | A1* | 10/2024 | Kamp .................. B29C 64/214 |
| 2024/0426129 | A1* | 12/2024 | Kenny .................. B33Y 80/00 |

FOREIGN PATENT DOCUMENTS

| | | |
|---|---|---|
| CN | 109531771 A | 3/2019 |
| DE | 102018116795 A1 | 1/2020 |
| EP | 1711328 B1 | 3/2013 |
| EP | 2735674 A1 | 5/2014 |
| EP | 3118394 A1 | 1/2017 |
| GB | 2525400 A | 10/2015 |
| KR | 20160010202 A | 1/2016 |
| KR | 101681544 B1 | 12/2016 |
| WO | WO0179131 A1 | 10/2001 |
| WO | WO2005/070657 A1 | 8/2005 |
| WO | WO2013/120889 A1 | 8/2013 |
| WO | WO2016/019434 A1 | 2/2016 |
| WO | WO2016/055222 A1 | 4/2016 |
| WO | WO2017/092766 A1 | 6/2017 |
| WO | WO2017/191404 A1 | 11/2017 |
| WO | WO2019/057267 A1 | 3/2019 |

OTHER PUBLICATIONS

Abdollahnejad et al., Comparative Study on the Effects of Recycled Glass-Fiber on Drying Shrinkage Rage and Mechanical Properties of the Self-Compacting Mortar and Fly Ash-Slag Geopolymer Mortar, Journal of Materials in Civil Engineering, vol. 29, No. 8, Aug. 2017. (Abstract Only) https://ascelibrary.org/doi/full/10.1061/%28ASCE%29MT.1943-5533.0001918.
Apis Cor, Laying Down Framework and Walls, Apr. 6, 2016. (Weblink Only) https://www.youtube.com/watch?v=ViqzfPW6TFo.
Bank et al., Concepts for Reusing Composite Materials from Decommissioned Wind Turbine Blades in Affordable Housing, Recycling, vol. 3, 2018, 11 Pages. https://www.mdpi.com/2313-4321/3/1/3/pdf.
Bank, Opportunities for Recycling and Reuse of FRP Composites for Construction in a Circular Economy, 2018, 19 Pages. https://static1.squarespace.com/static/5b324c409772ae52fecb6698/t/5b742fa48a922ddaec973fdd/1534341041431/Bank+CICE+2018+Keynote+FINAL.pdf.
Bos et al., Experimental Exploration of Metal Cable as Reinforcement in 3D Printed Concrete, MDPI, Journals, Materials, vol. 10, Issue 11, 2017, 1314, 22 Pages. https://doi.org/10.3390/ma10111314.
FHWA, Chapter 8—Rebar Cages, Drilled Shafts: Construction Procedures by FHWA, PileBuck, Jun. 29, 2016, 11 Pages. http://www.pilebuck.com/drilled-shafts-construction-procedures-fhwa/chapter-8-rebar-cages/.
Fox, Recycling Wind Turbine Blade Composite Material as Aggregate in Concrete, Thesis, Iowa State University, 2016, 57 Pages. https://www.imse.iastate.edu/files/2014/03/Fox-Tyler-Recycling-wind-turbine-blade-composite-material-as-aggregate-in-concrete.pdf.
Gosselin et al., Large-Scale 3D-Printing of Ultra-high Performance Concrete—A New Processing Route for Architects and Builders, ScienceDirect, Materials & Design, vol. 100, No. 15, Jun. 15, 2016, pp. 102-109. (Abstract Only).
Irving, 3D Printed Reinforced Concrete Bridge Opens in the Netherlands, New Atlas, Architecture, Oct. 17, 2017, 8 Pages. https://newatlas.com/3d-printed-concrete-bridges/51796/.
Kimm et al., Investigation of Surface Modification and Volume Content of Glass and Carbon Fibres from Fibre Reinforced Polymer Waste for Reinforcing Concrete, Journal of Hazardous Materials, vol. 390, Dec. 2019. (Abstract Only) https://www.sciencedirect.com/science/article/abs/pii/S0304389419317510.
Mechtcherine et al., 3D-Printed Steel Reinforcement for Digital Concrete Construction—Manufacture, Mechanical Properties and Bond Behaviour, ScienceDirect, Construction and Building Materials, vol. 179, No. 10, Aug. 10, 2018, pp. 125-137. (Abstract Only) https://doi.org/10.1016/j.conbuildmat.2018.05.202.
Molitch-Hou, 400-Square-Meter Villa 3D Printed Onsite in Just 45 Days, Engineering.com, 3D Printing, Jun. 2016. https://www.engineering.com/story/400square-meter-villa-3d-printed-onsite-in-just-45-days.
Novais et al., Effective Mechanical Reinforcement of Inorganic Polymers Using Glass Fibre Waste, Journal of Cleaner Production, vol. 166, Jul. 31, 2017, pp. 343-349. (Abstract Only) https://www.sciencedirect.com/science/article/abs/pii/S0959652617316992.
Novais et al., Incorporation of Glass Fibre Fabrics Waste into Geopolymer Matrices: An Eco-Friendly Solution for Off-Cuts Coming from Wind Turbine Blade Production, Construction and Building Materials, vol. 187, Oct. 30, 2018, pp. 876-883. (Abstract Only) https://www.sciencedirect.com/science/article/abs/pii/S0950061818319445.
Quigley, A Few Ways to Strengthen 3D Printed Parts, www.3ders.org , 3D Printer and 3D Printing News, Oct. 10, 2014, http://www.3ders.org/articles/20141010-a-few-ways-to-strengthen-3d-printed-parts.html.
Saccani et al., Composites Obtained by Recycling Carbon Fibre/Epoxy Composite Wastes in Building Materials, Construction and Building Materials, vol. 204, Apr. 20, 2019, pp. 296-302. (Abstract Only) https://www.sciencedirect.com/science/article/abs/pii/S0950061819302466.
Siemens Gamesa, Sustainability Report 2017, Renewable Energy, 49 Pages. https://www.siemensgamesa.com/en-int/-/media/siemensgamesa/downloads/en/investors-and-shareholders/corporate-governance/general-shareholders-meetings/2018/documentation/is-2017-eng.pdf.
Veolia, How Can Wind Turbine Blades Be Recycled, Living Circular. (Web Link Only) https://www.livingcircular.veolia.com/en/industry/how-can-wind-turbine-blades-be-recycled.
Yazdanbakhsh et al., Mechanical Processing of GFRP Waste into Large-Sized Pieces for Use in Concrete, MDPI Recycling, vol. 3, Issue 8, 2018, 11 Pages. https://pfds.semanticscholar.org/543d/5172927ee0b6999bd6d415303fa8ba61a186.pdf.

(56) References Cited

OTHER PUBLICATIONS

Zareiyan et al., Effects of Interlocking on Interlayer Adhesion and Strength of Structures in 3D Printing of Concrete, ScienceDirect, Automation in Construction, vol. 83, Nov. 2017, pp. 212-221. https://www.researchgate.net/publication/319162312_Effects_of_interlocking_on_interlayer_adhesion_and_strength_of_structures_in_3D_printing_of_concrete.
Chinese Office Action with Translation, Mar. 21, 2025.

\* cited by examiner

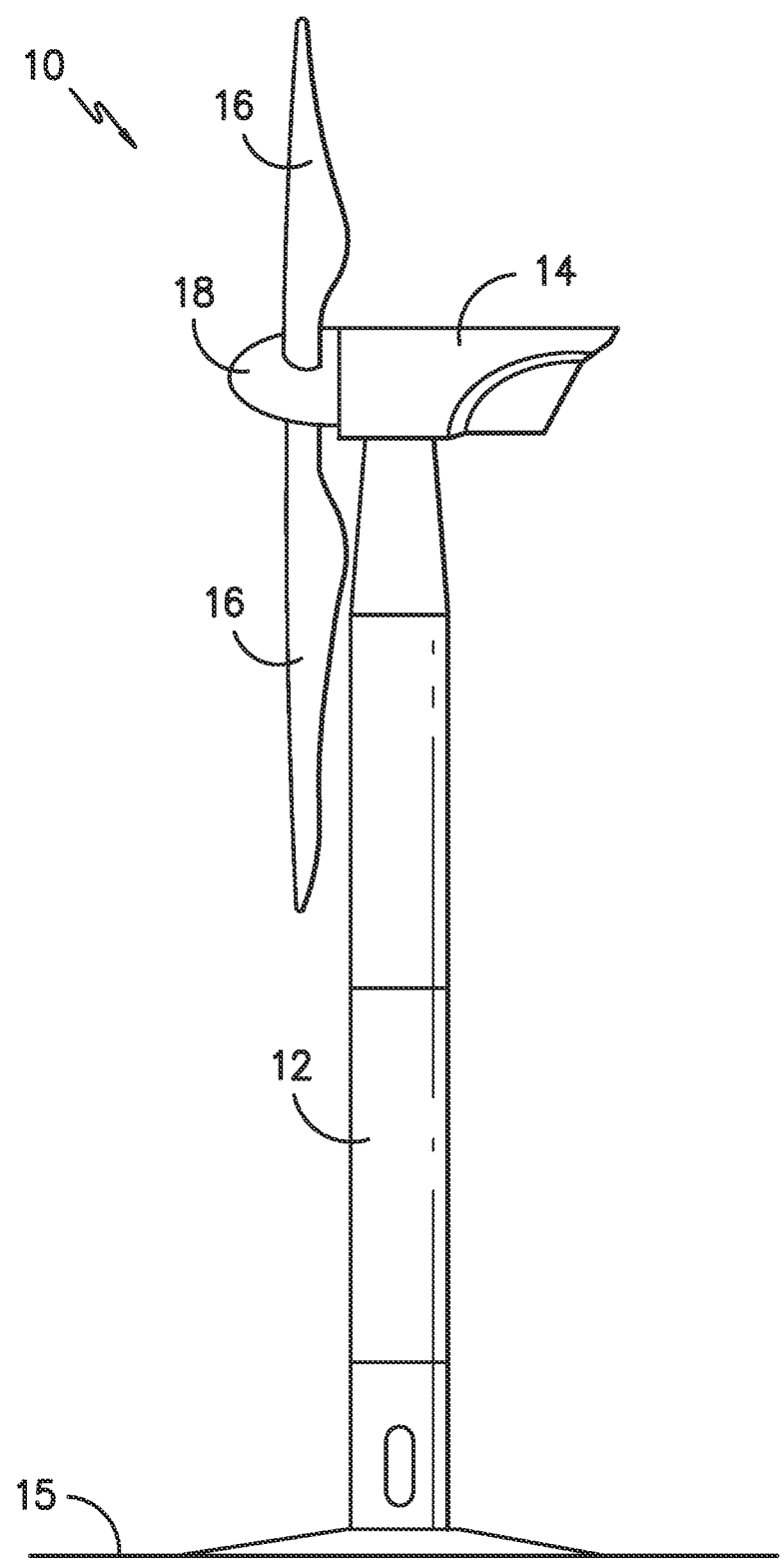
FIG. -1-

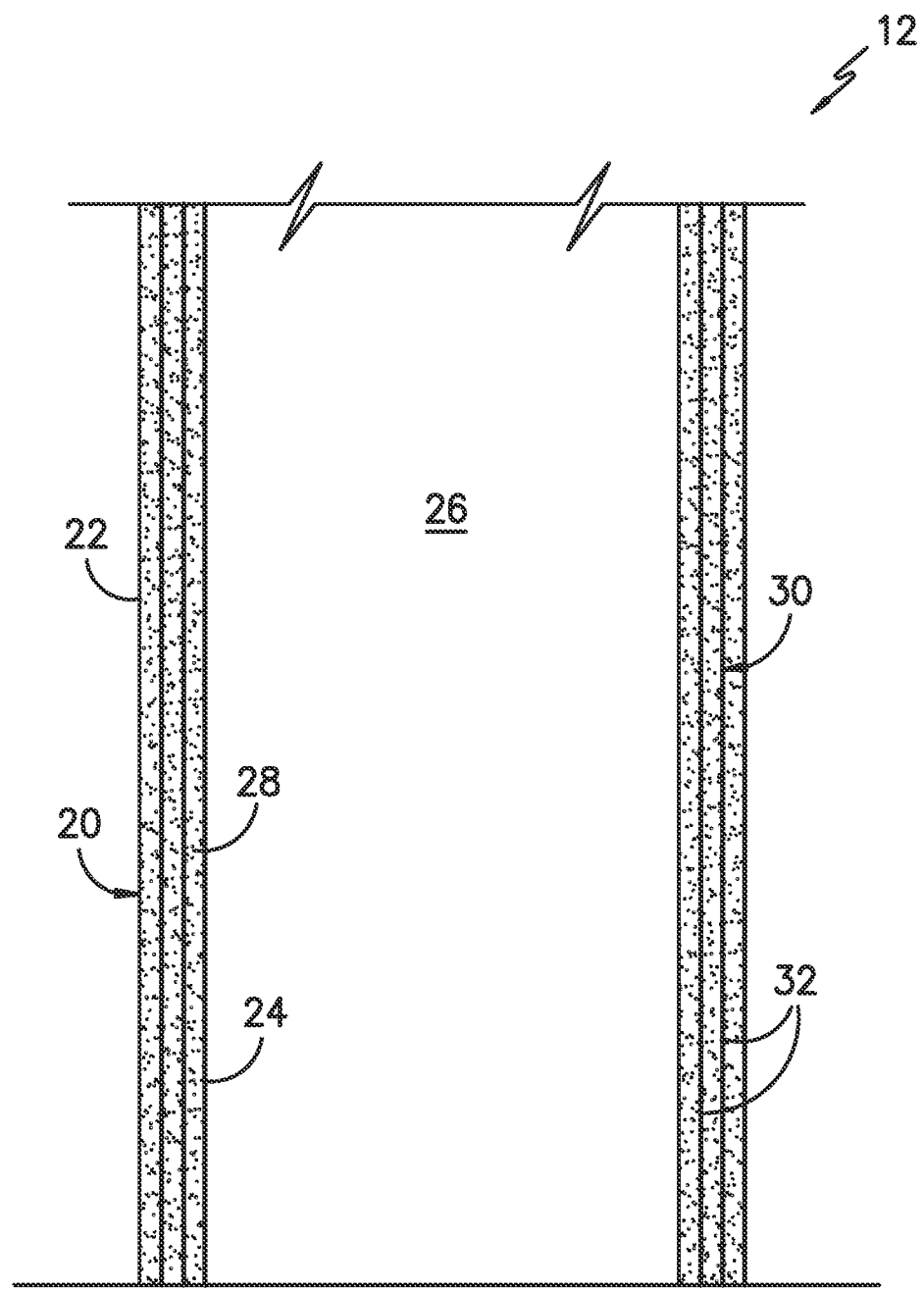
FIG. -2-

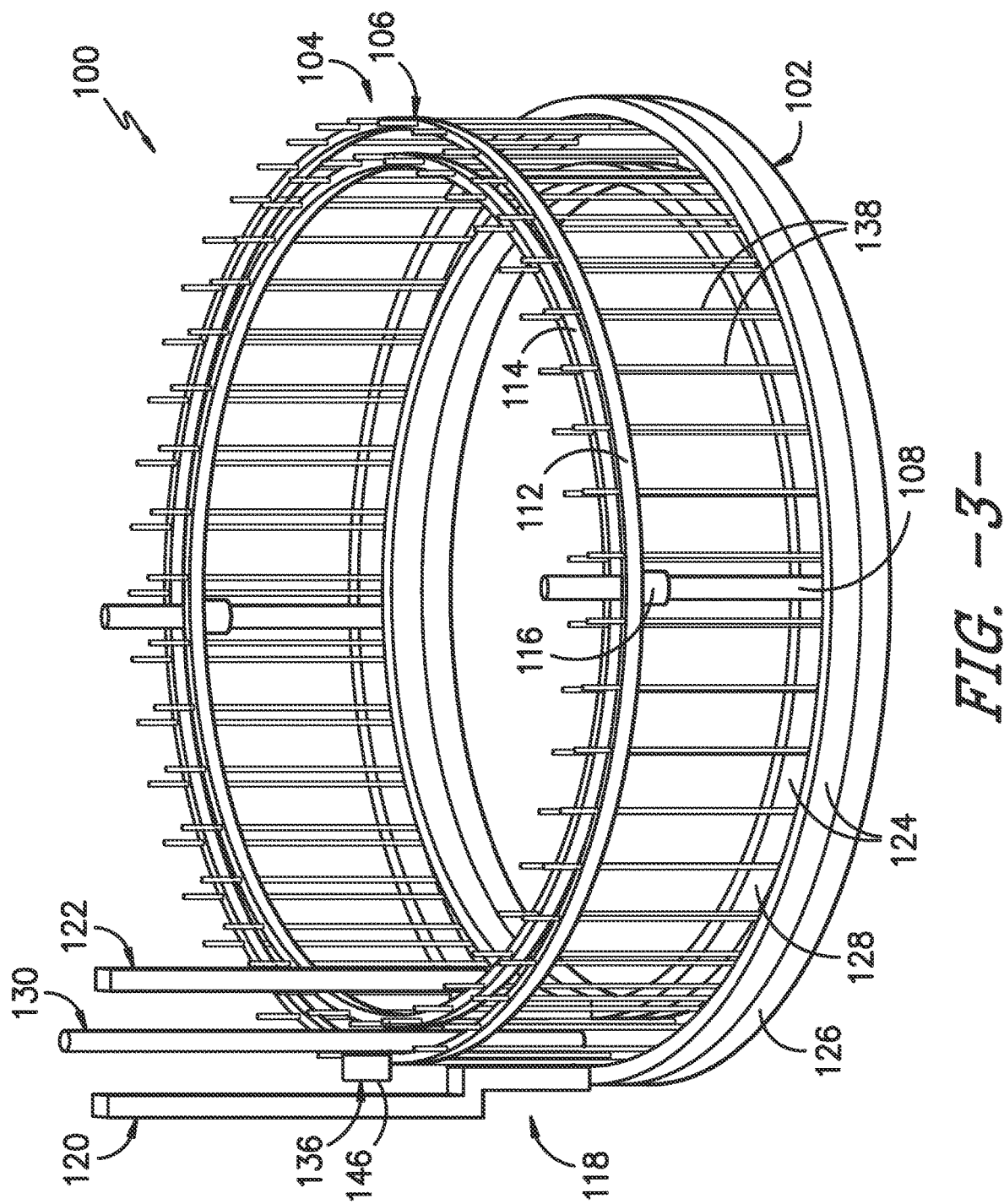
FIG. -3-

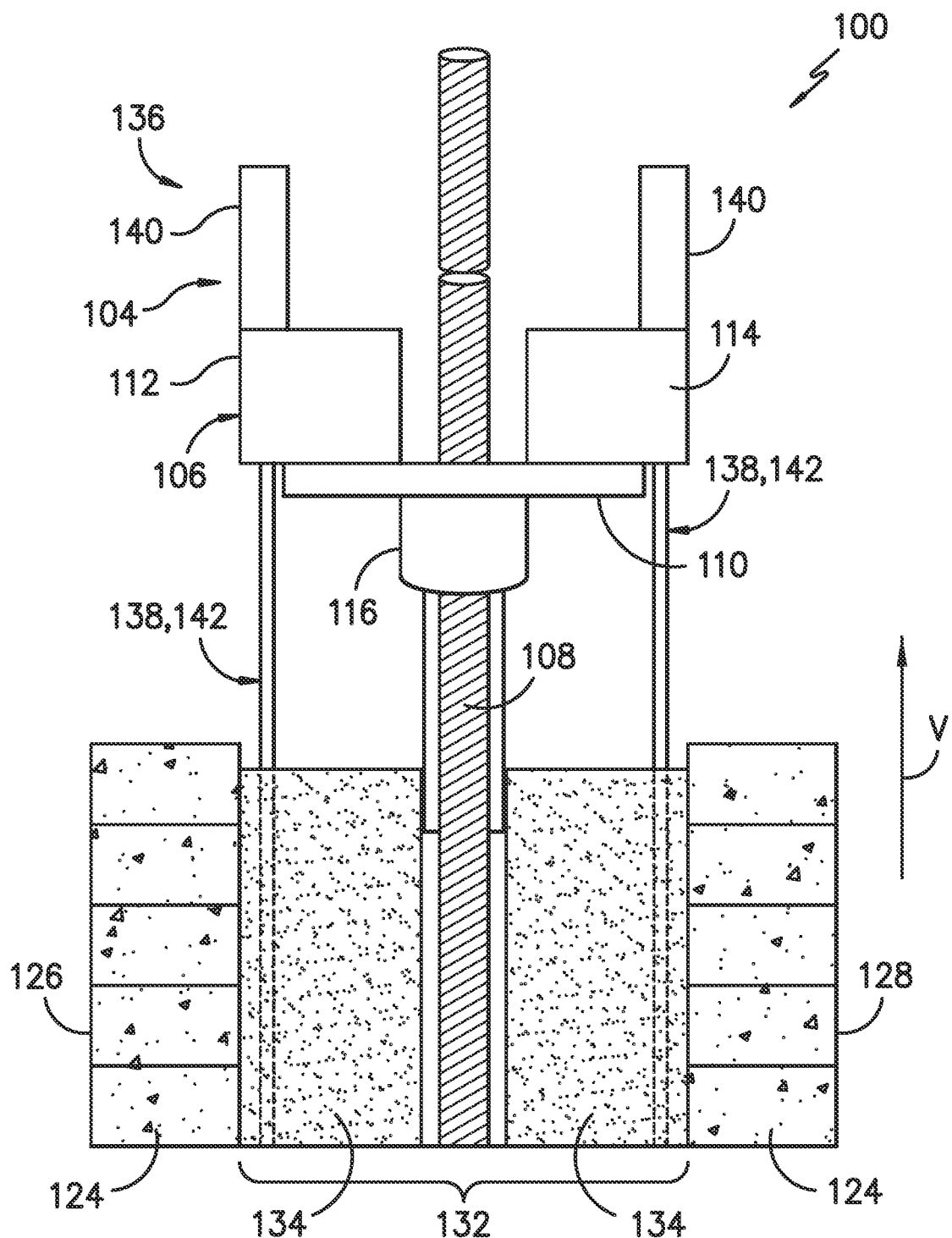
FIG. -4-

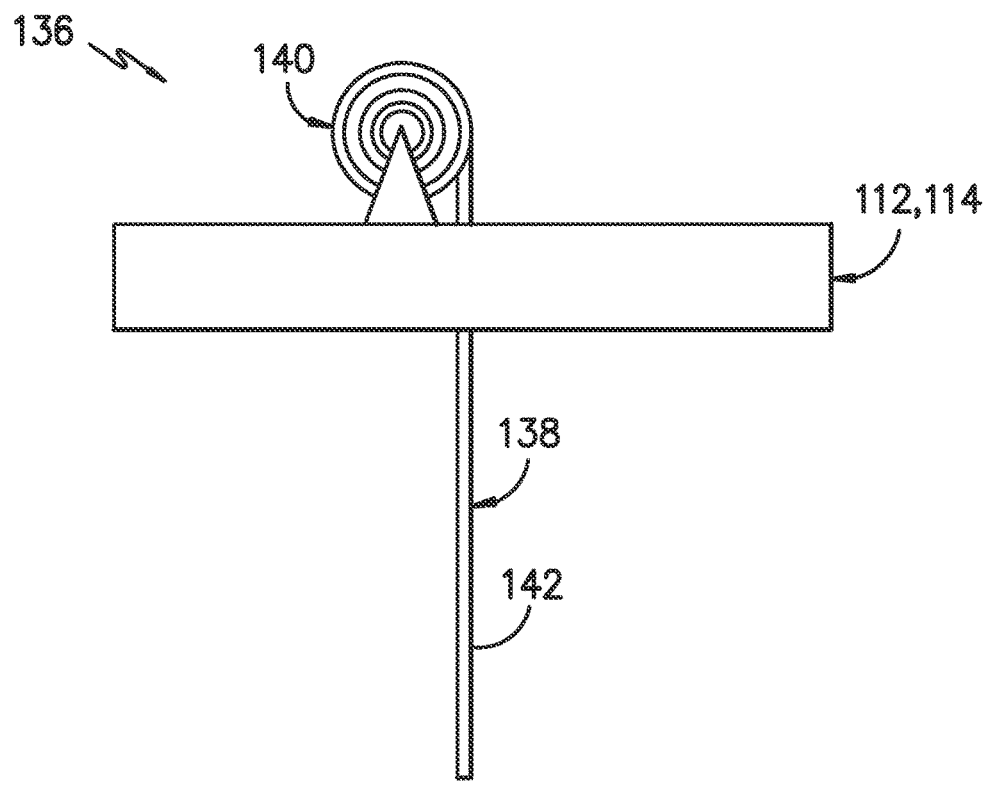
FIG. -5-
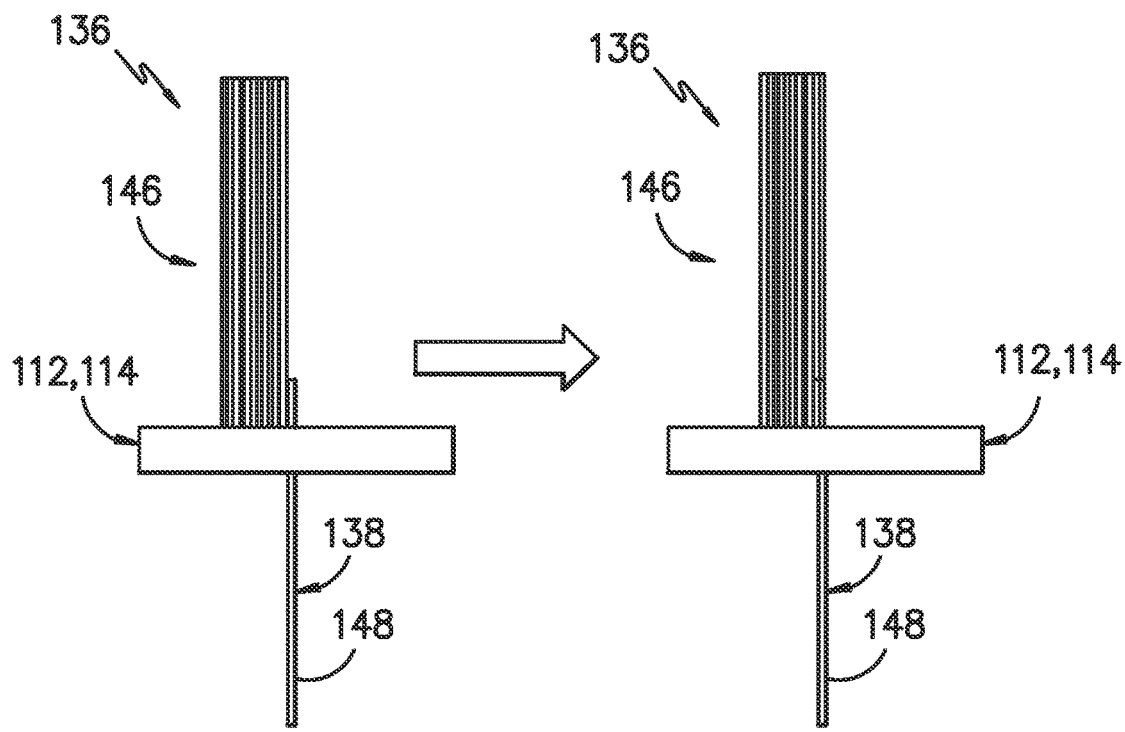
FIG. -6-

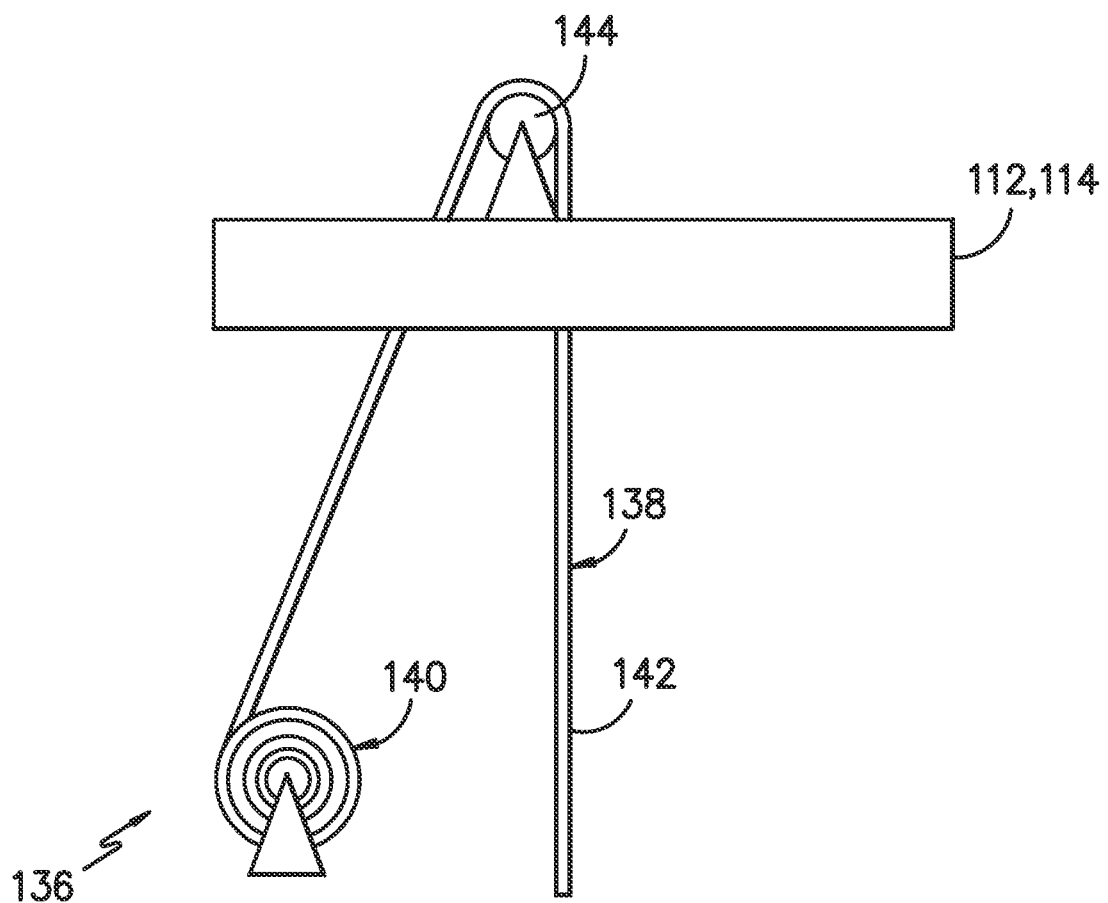
FIG. -7-

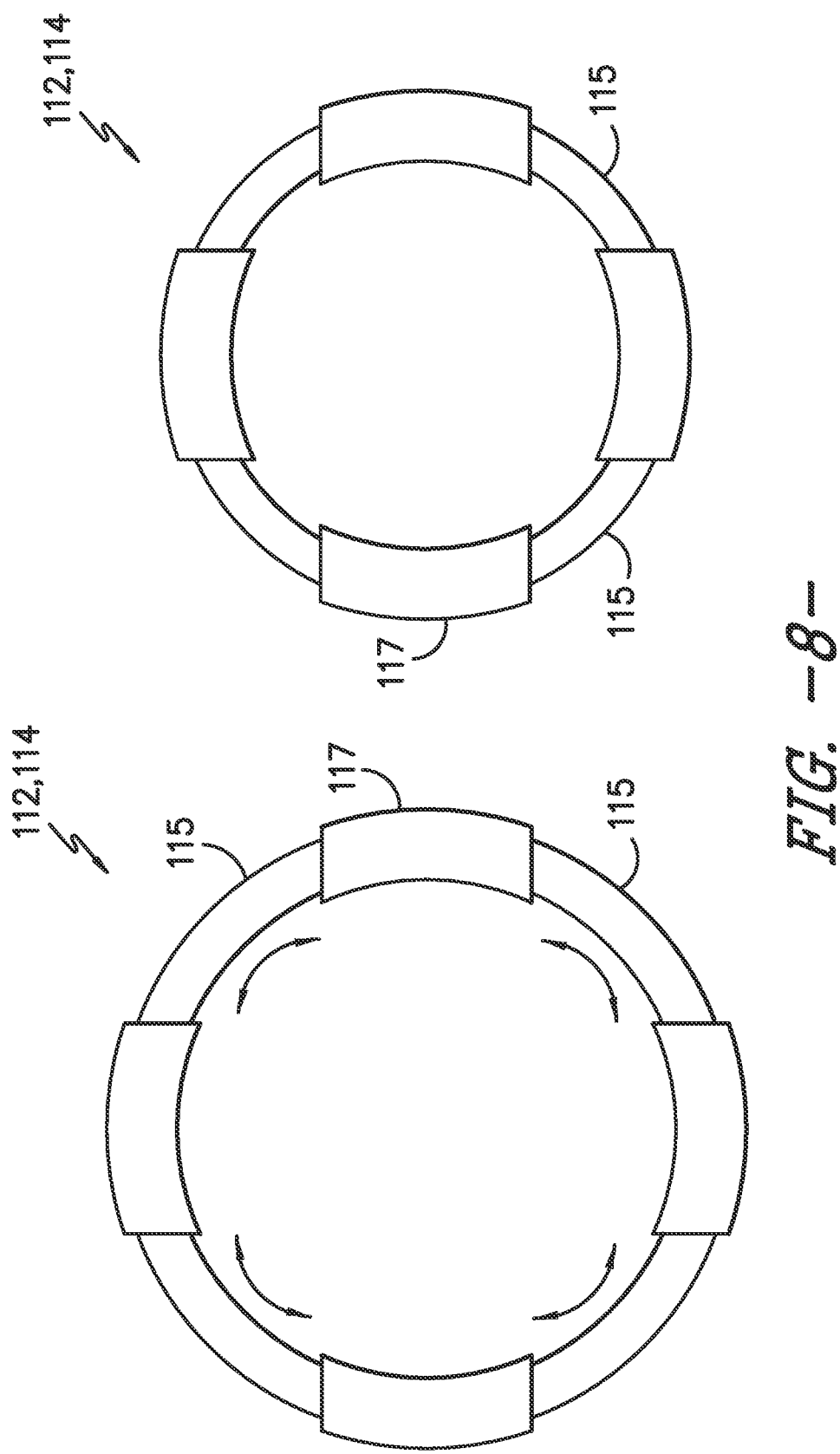
FIG. -8-

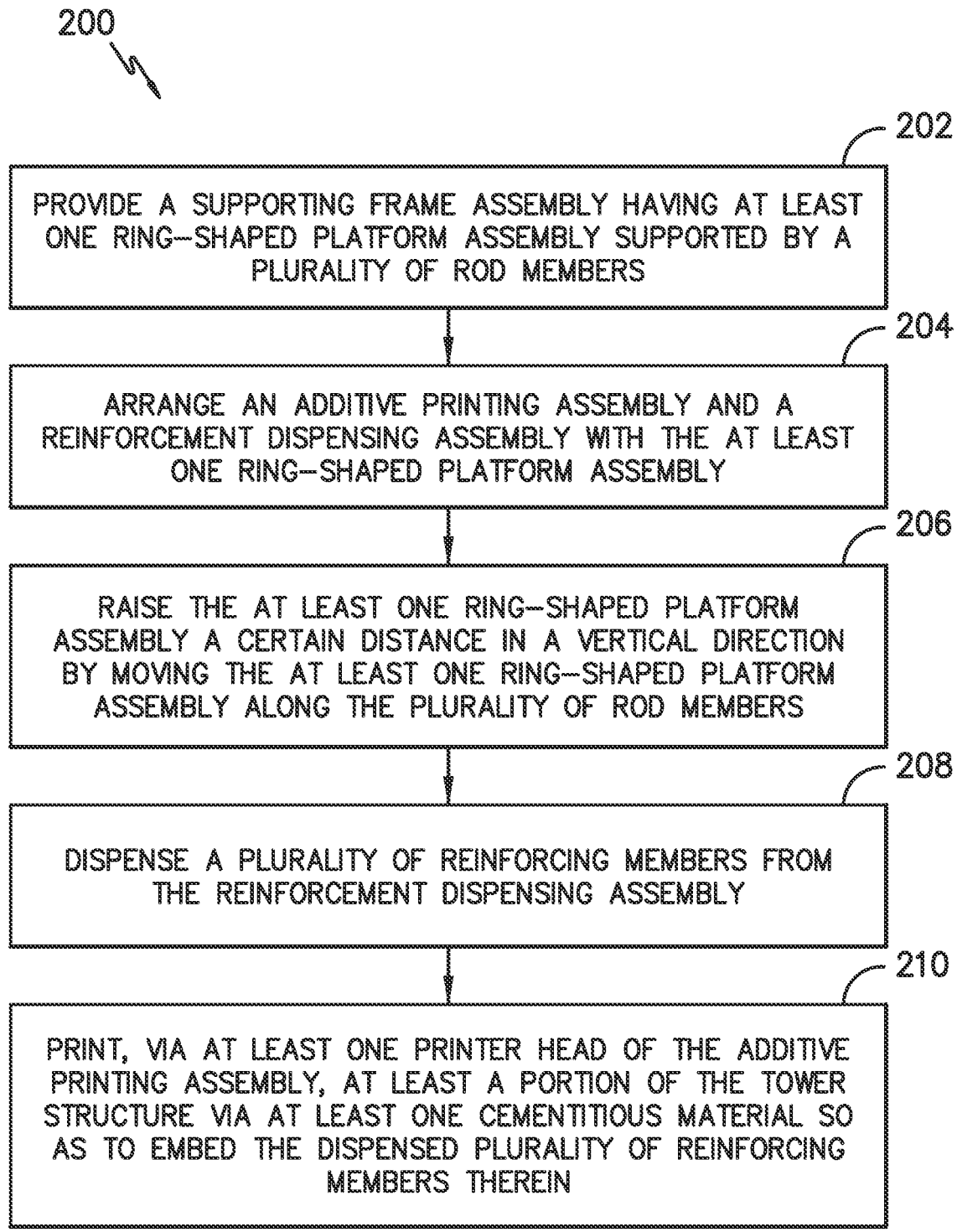
FIG. -9-

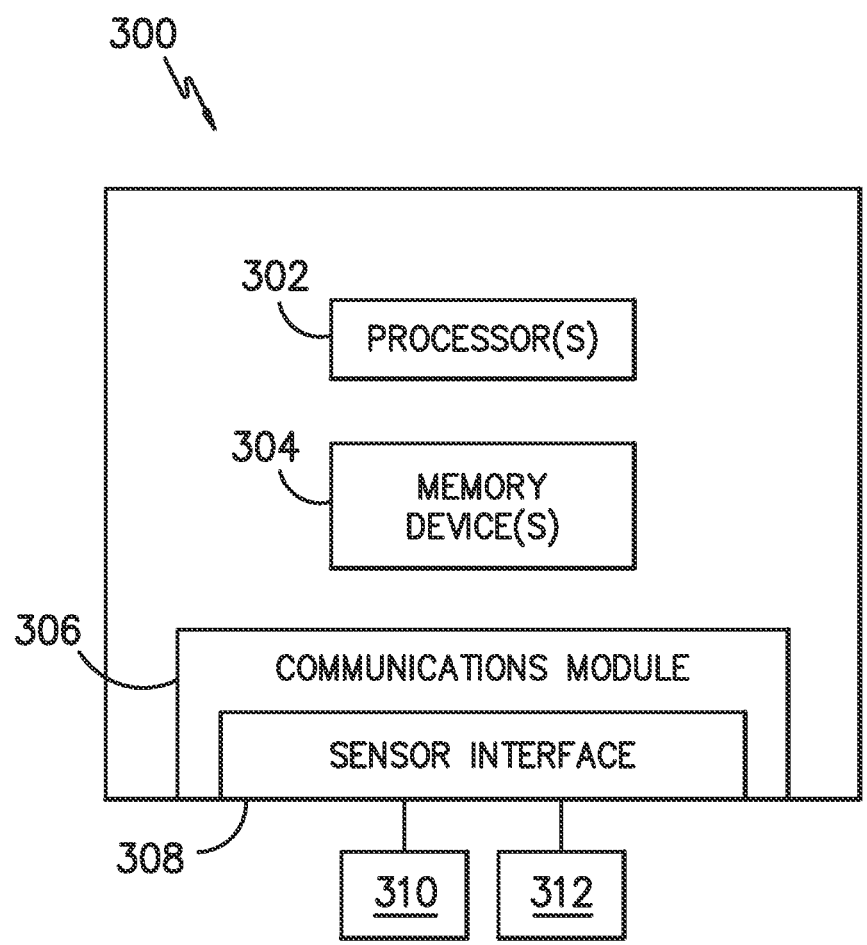
FIG. -10-

METHOD FOR MANUFACTURING WIND TURBINE TOWER STRUCTURE WITH EMBEDDED REINFORCEMENT ELEMENTS

RELATED APPLICATIONS

The present application claims priority to PCT Application Serial Number PCT/US2020/025929, filed on Mar. 31, 2020, which is incorporated by reference herein.

FIELD

The present disclosure relates in general to wind turbine towers, and more particularly to methods of manufacturing wind turbine tower structures with embedded reinforcement elements.

BACKGROUND

Wind power is considered one of the cleanest, most environmentally friendly energy sources presently available, and wind turbines have gained increased attention in this regard. A modern wind turbine typically includes a tower, a generator, a gearbox, a nacelle, and one or more rotor blades. The rotor blades capture kinetic energy of wind using known foil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

The wind turbine tower is generally constructed of steel tubes, pre-fabricated concrete sections, or combinations thereof. Further, the tubes and/or concrete sections are typically formed off-site, shipped on-site, and then arranged together to erect the tower. For example, one manufacturing method includes forming pre-cast concrete rings, shipping the rings to the site, arranging the rings atop one another, and then securing the rings together. As wind turbines continue to grow in size, however, conventional manufacturing methods are limited by transportation regulations that prohibit shipping of tower sections having a diameter greater than about 4 to 5 meters. Thus, certain tower manufacturing methods include forming a plurality of arc segments and securing the segments together on site to form the diameter of the tower, e.g. via bolting. Such methods, however, require extensive labor and can be time-consuming.

In view of the foregoing, the art is continually seeking improved methods for manufacturing wind turbine towers. Accordingly, the present disclosure is directed to methods for manufacturing wind turbine tower structures that address the aforementioned issues. In particular, the present disclosure is directed to methods for manufacturing wind turbine tower structures with embedded reinforcement elements.

BRIEF DESCRIPTION

Aspects and advantages of the invention will be set forth in part in the following description, or may be obvious from the description, or may be learned through practice of the invention.

In one aspect, the present disclosure is directed to a system for manufacturing a structure, such as a tower structure of a wind turbine. The system includes a supporting frame assembly moveable in a vertical direction of the structure. Further, the system includes an additive printing assembly secured to the supporting frame assembly. The additive printing assembly includes at least one printer head configured to dispense a first cementitious material. The system also includes a reinforcement dispensing assembly supported by the supporting frame assembly. Thus, the reinforcement dispensing assembly is configured to automatically and continuously dispense a plurality of reinforcing members as the structure is printed and built up via the at least one printer head and as the supporting frame assembly moves in the vertical direction.

In an embodiment, the printer head(s) of the additive printing assembly may include, at least, an outer printer head for printing an outer wall of the structure and an inner printer header for printing an inner wall of the structure. Further, in another embodiment, the additive printing assembly may include an intermediate printer head secured between the outer and inner printer heads for filling an area between the outer and inner tower walls with a second cementitious material.

In certain embodiments, the second cementitious material may be different than the first cementitious material. In particular, in one embodiment, the second cementitious material may be a self-compacting cementitious material.

In further embodiments, the supporting frame assembly may include at least one ring-shaped platform assembly supported by a plurality of rod members. More specifically, in an embodiment, the ring-shaped platform assembly may include a platform supporting an outer ring support member and an inner ring support member arranged concentrically with each other with the plurality of rod members extending therebetween. In particular embodiments, the outer and inner ring support members may each have an adjustable diameter.

In additional embodiments, the system may include a lifting jack that is moveable along each of the plurality of rod members so as to move the supporting frame assembly in the vertical direction by raising the outer and inner ring support members. In certain embodiments, the lifting jacks may be hydraulically-driven, pneumatically-driven, or mechanically-driven, such as via a screw, and/or combinations thereof In another embodiment, the reinforcement dispensing assembly may also include a plurality of roller devices and the plurality of reinforcing members may be reinforcing cables. In such embodiments, the reinforcing cables may be dispensed from the plurality of roller devices by automatically and continuously rolling the reinforcing cables therefrom under tension. Further, in an embodiment, the roller devices may be arranged atop the outer ring support member or the inner ring support member.

Alternatively, the reinforcement dispensing assembly may include a plurality of pulley blocks with one of the plurality of pulley blocks being arranged with each of the plurality of roller devices, the plurality of pulley blocks arranged atop the at least one ring-shaped platform assembly, the plurality of roller devices being arranged lower than the plurality of pulley blocks.

In yet another embodiment, the reinforcement dispensing assembly may include a plurality of feeder devices arranged atop at least one of the outer ring support member or the inner ring support member. In such embodiments, the reinforcing members may be reinforcing bars. Accordingly, the reinforcing bars may be dispensed from the plurality of feeder devices by automatically and continuously pushing the reinforcing bars therefrom.

In another aspect, the present disclosure may be directed to a method for manufacturing a structure. The method includes (a) providing a supporting frame assembly having at least one ring-shaped platform assembly supported by a plurality of rod members. Further, the method includes (b) arranging an additive printing assembly and a reinforcement dispensing assembly with the at least one ring-shaped platform assembly. Moreover, the method includes (c) raising the at least one ring-shaped platform assembly a certain distance in a vertical direction by moving the at least one ring-shaped platform assembly along the plurality of rod members. In addition, the method includes (d) dispensing a plurality of reinforcing members from the reinforcement dispensing assembly under tension. The method also includes (e) printing, via at least one printer head of the additive printing assembly, at least a portion of the structure via at least one cementitious material so as to embed the dispensed plurality of reinforcing members therein.

In an embodiment, the method may include repeating steps (c) through (d) to complete the structure.

In another embodiment, moving the at least one ring-shaped platform assembly along the plurality of rod members in the vertical direction may include hydraulically driving the at least one ring-shaped platform assembly along the plurality of rod members via a plurality of lifting jacks.

In further embodiments, printing, via the at least one printer head of the additive printing assembly, at least the portion of the structure via the at least one cementitious material may include printing, via outer and inner printer heads of the additive printing assembly, outer and inner walls of the structure of a first cementitious material and filling, via an intermediate printer head secured between the outer and inner printer heads, an area between the outer and inner walls of the structure with a second cementitious material. It should be understood that the method may further include any of the additional features and/or steps as described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a perspective view of one embodiment of a wind turbine according to the present disclosure;

FIG. 2 illustrates a cross-sectional view of one embodiment of a tower structure of a wind turbine according to the present disclosure;

FIG. 3 illustrates a partial, perspective view of one embodiment of a system for manufacturing a tower structure according to the present disclosure;

FIG. 4 illustrates a cross-sectional view of one embodiment of a system for manufacturing a tower structure according to the present disclosure;

FIG. 5 illustrates a schematic diagram of one embodiment of a reinforcement dispensing assembly of a system for manufacturing a tower structure according to the present disclosure;

FIG. 6 illustrates a schematic diagram of another embodiment of a reinforcement dispensing assembly of a system for manufacturing a tower structure according to the present disclosure;

FIG. 7 illustrates a schematic diagram of yet another embodiment of a reinforcement dispensing assembly of a system for manufacturing a tower structure according to the present disclosure;

FIG. 8 illustrates a top view of one of the outer and inner ring support members of a system for manufacturing a tower structure according to the present disclosure;

FIG. 9 illustrates a flow diagram of one embodiment of a method for manufacturing a tower structure according to the present disclosure; and FIG. 10 illustrates a block diagram of one embodiment of a controller of an additive printing device according to the present disclosure.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to systems and methods for manufacturing structures, such as tower structures, using automated deposition of cementitious materials via technologies such as additive manufacturing, 3-D Printing, spray deposition, extrusion additive manufacturing, concrete printing, automated fiber deposition, as well as other techniques that utilize computer numeric control and multiple degrees of freedom to deposit material. More specifically, the systems and methods of the present disclosure include an automated reinforcement integration module to gradually feed reinforcing members into the tower structure during the construction process, which allows for incorporation of continuous vertical reinforcing members into the completed concrete structure.

Thus, the methods described herein provide many advantages not present in the prior art. For example, the systems and methods of the present disclosure allow for automation of integrating both vertical and horizontal reinforcing members into a tower structure during construction, enable full automation of concrete structure construction, simplify the construction process with faster speeds, accommodates both steel cable and conventional steel rebar as reinforcement, and directly forms the conduits for post-tension bars or cables, which are necessary for concrete towers.

Referring now to the drawings, FIG. 1 illustrates one embodiment of a wind turbine 10 according to the present disclosure. As shown, the wind turbine 10 includes a tower 12 extending from a foundation 15 or support surface with a nacelle 14 mounted atop the tower 12. A plurality of rotor blades 16 are mounted to a rotor hub 18, which is in turn connected to a main flange that turns a main rotor shaft. The wind turbine power generation and control components are housed within the nacelle 14. The view of FIG. 1 is provided for illustrative purposes only to place the present invention in an exemplary field of use. It should be appreciated that the invention is not limited to any particular type of wind turbine configuration. In addition, the present invention is not limited to use with wind turbine towers but may be utilized in any application having concrete constructions and/or tall towers in addition to wind towers, including for example homes, bridges, tall towers and other aspects of the concrete industry. Further, the methods described herein may also apply to manufacturing any similar structure that benefits from the advantages described herein.

Referring now to FIG. 2, a cross-sectional view of a tower structure 12 of a wind turbine 10 manufactured according to the present disclosure is illustrated. As shown in the illustrated embodiment, the tower structure 12 defines a circumferential tower wall 20 having an outer surface 22 and an inner surface 24. Further, as shown, the circumferential tower wall 20 generally defines a hollow interior 26 that is commonly used to house various turbine components (e.g. a power converter, transformer, etc.). In addition, as will be described in more detail below, the tower structure 12 is formed using additive manufacturing. Moreover, as shown, the tower structure 12 is formed of a cementitious material 28 that is reinforced with one or more reinforcement elements 30. In particular embodiments, the reinforcement element(s) 30 may include, for example, elongated reinforcing cables or wires, reinforcing bars (also referred to as rebar), (hollow or solid), fibers (such as metal, glass, or carbon fibers) and/or any such structures or materials as may be known in the art to reinforce concrete structures. For example, as shown in FIG. 2, the tower structure 12 may include a plurality of pre-tensioned linear cables 32 embedded in the cementitious material 28.

In addition, the cementitious material 28 described herein may include any suitable workable paste that is configured to bind together after curing to form a structure. As examples, a cementitious material may include lime or calcium silicate based hydraulically setting materials such as Portland cement, fly ash, blast furnace slag, pozzolan, limestone fines, gypsum, or silica fume, as well as combinations of these. In some embodiments, the cementitious material 28 may additionally or alternatively include non-hydraulic setting material, such as slaked lime and/or other materials that harden through carbonation. Cementitious materials may be combined with fine aggregate (e.g., sand) to form mortar, or with rough aggregate (sand and gravel) to form concrete, including both cement-based and non-cement based concretes. For example, in certain embodiments, the cementitious material may include geopolymer concrete, biopolymer concrete, or any other suitable concrete. A cementitious material may be provided in the form of a slurry, which may be formed by combining any one or more cementitious materials with water, as well as other known additives, including accelerators, retarders, extenders, weighting agents, dispersants, fluid-loss control agents, lost-circulation agents, strength-retrogression prevention agents, free-water/free-fluid control agents, expansion agents, plasticizers (e.g., superplasticizers such as polycarboxylate superplasticizer or polynaphthalene sulfonate superplasticizer), and so forth. The relative amounts of respective materials to be provided in a cementitious material may be varied in any manner to obtain a desired effect.

Referring now to FIGS. 3-9, the present disclosure is directed to systems and methods for manufacturing tower structures, such as wind turbine towers, via additive manufacturing. Additive manufacturing, as used herein, is generally understood to encompass processes used to synthesize three-dimensional objects in which successive layers of material are formed under computer control to create the objects. As such, objects of almost any size and/or shape can be produced from digital model data. It should further be understood that the additive manufacturing methods of the present disclosure may encompass three degrees of freedom, as well as more than three degrees of freedom such that the printing techniques are not limited to printing stacked two-dimensional layers but are also capable of printing curved and/or irregular shapes.

Referring particularly to FIG. 3, a perspective view of one embodiment of a system 100 for manufacturing a tower structure 102 according to the present disclosure is illustrated. As shown, the system 100 includes a supporting frame assembly 104 moveable in a vertical direction of the tower structure 102. More specifically, as shown in FIGS. 3 and 4, the supporting frame assembly 104 may include a ring-shaped platform assembly 106 supported by a plurality of rod members 108. For example, as shown in the illustrated embodiment, the ring-shaped platform assembly 106 may include a platform 110 supporting an outer ring support member 112 and an inner ring support member 114 arranged concentrically with each other with the plurality of rod members extending therebetween 108.

In particular embodiments, the outer and inner ring support members 112, 114 may each have an adjustable diameter. For example, as shown in FIG. 8, the outer and inner ring support members 112, 114 may be segmented, with the segments 115 joined together via slidable, hollow sleeves 117. Thus, as shown, the slidable, hollow sleeves 117 are configured to receive varying lengths of the segments 115 so as to adjust the diameter of the outer and inner ring support members 112, 114. In certain embodiments, the hollow sleeves 117 and/or the segments 115 may be sufficiently flexible to enable the radius of curvature to change over the range of tower diameters. Accordingly, the outer and inner ring support members 112, 114 can be adjusted to accommodate tower structures of varying sizes.

Referring now particularly to FIGS. 3 and 4, the system 100 may include a lifting jack 116 that is moveable along each of the plurality of rod members 108 so as to move the supporting frame assembly 104 in the vertical direction V, i.e. by raising the outer and inner ring support members 112, 114 continuously or incrementally. In certain embodiments, the lifting jacks 116 may be hydraulically-driven screw jack. In further embodiments, the lifting jacks 116 may be driven using any suitable means, such as pneumatic, mechanical, etc. Thus, by lifting the lifting jack(s) 116, the supporting frame assembly 104 can be lifted to any desired height.

Referring particularly to FIG. 3, the system 100 also includes an additive printing assembly 118 secured to the supporting frame assembly 104. It should be understood that the additive printing assembly 118 described herein generally refers to any suitable additive printing device having one or more nozzles or printer heads for depositing material (such as the cementitious material described herein) onto a surface that is automatically controlled by a controller to form an object programmed within the computer (such as a CAD file). More specifically, as shown, the additive printing assembly 118 may include at least one printer head 120, 122 configured to dispense a first cementitious material 124. For example, in an embodiment, as shown in FIG. 3, the printer head(s) 120, 122 of the additive printing assembly 118 may include, at least, an outer printer head 120 for printing an outer wall 126 of the tower structure 102 and an inner printer header 122 for printing an inner wall 128 of the tower structure 102.

In addition, as shown, the additive printing assembly 118 may also include an intermediate printer head 130 secured between the outer and inner printer heads 120, 122. As such, in certain embodiments, the intermediate printer head 130 may be a pump for filling an area 132 between the outer and inner tower walls 126, 128 with a second cementitious material 134 may be different than the first cementitious material 124. In particular, in one embodiment, the first cementitious material 124 may be a fast-setting concrete. Therefore, the printed outer and inner walls can harden very quickly and can thus hold hydrostatic pressure of poured concrete. Accordingly, the second cementitious material 134 may be a self-compacting cementitious material. In further embodiments, the additive printing assembly 118 may include any suitable number of printer heads including more than three printer heads or less than three printer heads.

Referring now to FIGS. 3-7, the system 100 also includes a reinforcement dispensing assembly 136 supported by the supporting frame assembly 104. Thus, the reinforcement dispensing assembly 136 is configured to automatically and continuously dispense a plurality of reinforcing members 138 as the tower structure 102 is printed and built up via the printer head(s) 120, 122, 130 and as the supporting frame assembly 104 moves in the vertical direction V. For example, as shown in FIGS. 3-5 and 7, the reinforcement dispensing assembly 136 may include a plurality of roller devices 140. In such embodiments, the reinforcing members 138 may be reinforcing cables 142 or wires. In such embodiments, the reinforcing cables 40 may be dispensed from the roller devices 140, e.g. by automatically and continuously rolling the reinforcing cables 142 therefrom under tension. Further, in an embodiment, as shown in FIGS. 3-5, the roller devices 140 may be arranged atop the outer or inner ring support members 112, 114.

Alternatively, as shown in FIG. 7, the reinforcement dispensing assembly 136 may include a plurality of pulley blocks 144 with one of the plurality of pulley blocks 144 being arranged with each of the plurality of roller devices 140. Accordingly, as show, the pulley blocks 144 may be arranged atop the outer or inner ring support members 112, 114 and the roller devices 140 may be arranged lower than the pulley blocks 144, such as on the ground.

Referring to FIG. 6, in alternative embodiments, the reinforcement dispensing assembly 136 may include a plurality of feeder devices 146 arranged atop the outer or inner ring support members 112, 114. In such embodiments, the reinforcing members 138 may be reinforcing bars 148. Accordingly, as shown, the reinforcing bars 148 may be dispensed from the feeder devices 146 by automatically and continuously pushing the reinforcing bars 148 therefrom.

Referring particularly to FIG. 9, a flow diagram of one embodiment of a method 200 for manufacturing a tower structure 102 according to the present disclosure is illustrated is illustrated. In general, the method 200 will be described herein with reference to the tower structure 102, such as a wind turbine tower, formed using the system 100 shown in FIGS. 3-8. However, it should be appreciated that the disclosed method 200 may be implemented to form other similar tower structures having any other suitable configurations. In addition, although FIG. 9 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown at (202), the method 200 may include providing the supporting frame assembly 104 described herein. As shown at (204), the method 200 may include arranging the additive printing assembly 118 and the reinforcement dispensing assembly 136 with the ring-shaped platform assembly 106 of the supporting frame assembly 104. As shown at (206), the method 200 may include raising the ring-shaped platform assembly 106 to a certain distance in the vertical direction V by moving the ring-shaped platform assembly 106 along the plurality of rod members 108, e.g. via a plurality of lifting jacks 116.

While the ring-shaped platform assembly 106 is being lifted or after, as shown at (208), the method 200 may include dispensing a plurality of reinforcing members 138 from the reinforcement dispensing assembly 136. For example, as mentioned, in an embodiment, the reinforcing member(s) 138 may be reinforcing cable 142 that is unwound from a rolling device 140 under tension. Alternatively, as mentioned, the reinforcing member(s) 138 may be reinforcing bards 148 that are pushed down and into a space that will ultimately be filled or printed with cementitious material.

It should be understood that the reinforcing member(s) 138 may extend along the entire height of the tower structure 102 or along only a portion of the tower height. In addition, in such embodiments, the additive printing assembly 118 is configured to print the cementitious material around the reinforcing member(s) 138. In alternative embodiments, the reinforcement dispensing assembly 136 may be configured to provide tension to the reinforcing member(s) 138, such as when the member(s) are cables, during printing of the tower structure 102 and/or during lifting of the supporting frame assembly 104. In such embodiments, the method 200 may also include varying a tension of the one or more reinforcing member(s) 138 as a function of a cross-section of the tower structure 102 during the printing process. Thus, such reinforcing member(s) 138 are configured to manage tensile stresses of the tower structure 102.

Referring still to FIG. 9, as shown at (210), the method 200 may include printing, via at least one printer head of the additive printing assembly 118, at least a portion of the tower structure 102 via at least one cementitious material so as to embed the dispensed plurality of reinforcing members 138 therein. For example, in an embodiment, as shown in FIG. 4, the method 200 may include printing, via the outer and inner printer heads 120, 122 of the additive printing assembly 118, the outer and inner walls 126, 128 of the tower structure 102 of the first cementitious material 124. Such walls 126, 128 may be printed simultaneously to save time or separately, if needed. Then, the method 200 may include filling, via the intermediate printer head 130 secured between the outer and inner printer heads 120, 122, the area 132 between the outer and inner walls 126, 128 with the second cementitious material 134 so as to completely cast the tower structure 102. This process (i.e. steps 206, 208 and 210) can be repeated to complete the tower structure 102 up to any suitable height. Moreover, in certain embodiments, the rod members 108 of the supporting frame assembly 104 may be removed after construction of the tower structure 102, thereby creating holes or channels that can be used as conduits for post-tension bars or cables.

In addition, in certain embodiments, the additive printing assembly 118 is configured to print the cementitious material in a manner that accounts for the cure rate thereof such that the tower structure 102, as it is being formed, can bond to itself. In addition, the additive printing assembly 118 is configured to print the tower structure 102 in a manner such that it can withstand the weight of the walls 126, 128 as the additively-formed cementitious material can be weak during printing. Thus, the reinforcement element(s) 138 of the tower structure 12 are provided to enable the tower to withstand wind loads that can cause the tower 12 to be susceptible to cracking.

Referring now to FIG. 10, a block diagram of one embodiment of a controller 300 configured to control the additive printing assembly 118 described herein is illustrated. As shown, the controller 300 may include one or more processor(s) 302 and associated memory device(s) 304 configured to perform a variety of computer-implemented functions (e.g., performing the methods, steps, calculations and the like and storing relevant data as disclosed herein). Additionally, the controller 300 may also include a communications module 306 to facilitate communications between the controller 300 and the various components of the additive printing assembly 118. Further, the communications module 306 may include a sensor interface 308 (e.g., one or more analog-to-digital converters) to permit signals transmitted from one or more sensors 310, 312 to be converted into signals that can be understood and processed by the processor(s) 302. It should be appreciated that the sensors may be communicatively coupled to the communications module 306 using any suitable means. For example, as shown in FIG. 10, the sensors 310, 312 may be coupled to the sensor interface 308 via a wired connection. However, in other embodiments, the sensors 310, 312 may be coupled to the sensor interface 308 via a wireless connection, such as by using any suitable wireless communications protocol known in the art. As such, the processor(s) 302 may be configured to receive one or more signals from the sensors.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. The processor(s) 302 is also configured to compute advanced control algorithms and communicate to a variety of Ethernet or serial-based protocols (Modbus, OPC, CAN, etc.). Additionally, the memory device(s) 304 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 304 may generally be configured to store suitable computer-readable instructions that, when implemented by the processor(s) 302, configure the controller 300 to perform the various functions as described herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:
1. A system for manufacturing a structure, the system comprising:
   a supporting frame assembly moveable in a vertical direction of the structure;
   an additive printing assembly secured to the supporting frame assembly, the additive printing assembly comprising at least one printer head configured to dispense a first cementitious material; and,
   a reinforcement dispensing assembly supported by the supporting frame assembly, the reinforcement dispensing assembly configured to automatically and continuously dispense a plurality of reinforcing members as the structure is printed and built up via the at least one printer head and as the supporting frame assembly moves in the vertical direction,
   wherein the supporting frame assembly comprises at least one ring-shaped platform assembly supported by a plurality of rod members, and
   wherein the at least one ring-shaped platform assembly comprises a platform supporting an outer ring support member and an inner ring support member arranged concentrically with each other with the plurality of rod members extending therebetween.

2. The system of claim 1, wherein the at least one printer head of the additive printing assembly further comprises, at least, an outer printer head for printing an outer wall of the structure and an inner printer header for printing an inner wall of the structure.

3. The system of claim 2, wherein the additive printing assembly further comprises an intermediate printer head secured between the outer and inner printer heads for filling an area between the outer and inner tower walls with a second cementitious material.

4. The system of claim 3, wherein the second cementitious material is different than the first cementitious material.

5. The system of claim 4, wherein the second cementitious material is a self-compacting cementitious material.

6. The system of claim 1, wherein the outer and inner ring support members each comprise an adjustable diameter.

7. The system of claim 1, further comprising a lifting jack arranged with each of the plurality of rod members and movable along each of the plurality of rod members so as to move the supporting frame assembly in the vertical direction by raising the outer and inner ring support members.

8. The system of claim 7, wherein the lifting jacks are driven via at least one of hydraulics, pneumatics, or mechanics.

9. The system of claim 1, wherein the reinforcement dispensing assembly further comprises a plurality of roller devices, the plurality of reinforcing members comprising reinforcing cables, the reinforcing cables being dispensed from the plurality of roller devices by automatically and continuously rolling the reinforcing cables therefrom under tension.

10. The system of claim 9, wherein the plurality of roller devices are arranged atop at least one of the outer ring support member or the inner ring support member.

11. The system of claim 9, wherein the reinforcement dispensing assembly further comprises a plurality of pulley blocks with one of the plurality of pulley blocks being arranged with each of the plurality of roller devices, the plurality of pulley blocks arranged atop the at least one ring-shaped platform assembly, the plurality of roller devices being arranged lower than the plurality of pulley blocks.

12. The system of claim 1, wherein the reinforcement dispensing assembly further comprises a plurality of feeder devices arranged atop at least one of the outer ring support member or the inner ring support member, the plurality of reinforcing members comprising reinforcing bars, wherein the reinforcing bars are dispensed from the plurality of feeder devices by automatically and continuously pushing the reinforcing bars therefrom.

\* \* \* \* \*